Patented Mar. 13, 1928.

1,662,397

UNITED STATES PATENT OFFICE.

ALFRED E. PARMELEE, OF CARNEYS POINT, NEW JERSEY, ASSIGNOR TO E. I. DU PONT DE NEMOURS & COMPANY, OF WILMINGTON, DELAWARE, A CORPORATION OF DELAWARE.

PREPARATION OF TRIARYLGUANIDINES.

No Drawing. Application filed April 9, 1924. Serial No. 705,210.

This invention relates to a new process of preparing triarylguanidines, and more particularly to one in which a halogenated hydrocarbon is used as a solvent medium.

In prior processes of manufacturing such compounds a solvent such as alcohol has been used, and more recently an inert solvent such as the hydrocarbon toluene which is immiscible with water, has been used in such a manner as to reflux the solvent while continuously removing the water formed during the operation.

I have discovered that a cleaner separation of the triarylguanidine, and a purer product can be obtained by using a halogenated hydrocarbon, particularly a low freezing halogen derivative of an aromatic hydrocarbon.

As a preferred embodiment of the invention the following procedure will be given, it being, however, understood that it is illustrative merely and not definitive.

In a flask or vessel provided with an agitating means there are mixed 68.4 g. thiocarbanilide, 200 c. c. chlorobenzene, and 30 c. c. aniline. The flask is also provided with a continuously separating reflux condenser of usual design, and is heated in an oil bath. The flask is heated until the chlorobenzene boils, whereupon it is allowed to reflux until it is free from water. Then 84.4 g. basic lead carbonate are slowly introduced, and the mass is further heated and reflux permitted to continue until no more water is evolved. This marks the completion of the reaction. The hot mass is then filtered and the lead sulfide sludge is washed with hot chlorobenzene. The combined filtrate and washings are evaporated to a small volume. On cooling the triphenylguanidine separates from solution and is filtered off and washed once with cold chlorobenzene.

The isolated triphenylguanidine is pure white, and analysis shows it to be 99% pure. Its melting point is 146° C. whereas the literature gives it as 144.5° C. The yield is 90% of the theoretical yield.

In a similar way triarylguanidines may be prepared from diaryl thioureas and aryl amines, by the aid of a desulfurizing agent, in the presence of a halogenated hydrocarbon solvent. In the above given example, the triphenylguanidine, aniline, and thiocarbanilide are soluble in the chlorobenzene, while the latter is insoluble in water. Substituted and otherwise modified products may be similarly prepared. Halogen derivatives of hydrocarbons having freezing points of about 10° C. or lower, and boiling points above 100° C. are especially suitable for use in the present process.

As many apparently widely different embodiments of this invention may be made without departing from the spirit thereof, it is to be understood that I do not intend to limit myself to the specific embodiments thereof except as indicated in the appended claims.

I claim:

1. The process of making a triarylguanidine, which comprises treating a diaryl thiourea with an aryl amine and a desulfurizing agent in the presence of a chlorobenzene.

2. The process of making a triarylguanidine, which comprises treating a diaryl thiourea with an aryl amine and a desulfurizing agent in the presence of chlorobenzene, distilling and refluxing said halogenated hydrocarbon, and removing water therefrom.

3. The process of making triphenylguanidine, which comprises treating thiocarbanilide with aniline and a desulfurizing agent in the presence of chlorobenzene.

4. The process of making triphenylguanidine, which comprises treating thiocarbanilide with aniline and a desulfurizing agent in the presence of chlorobenzene, distilling and refluxing said halogenated hydrocarbon, and removing water therefrom.

5. The process of making triphenylguanidine which comprises heating thiocarbanilide, aniline, and basic lead carbonate in the presence of chlorobenzene.

In testimony whereof I affix my signature.

ALFRED E. PARMELEE.